April 23, 1935.

D. C. WRIGHT

Re. 19,547

MOTOR CONTROL SYSTEM

Original Filed Sept. 28, 1929

HOISTING SWITCHES

| | | 7 | 10 | 18 | 23 | 25 | 14 | 15 | 16 |
|---|---|---|---|---|---|---|---|---|---|
| | OFF | | | • | | | | | |
| S | 1 | • | | • | | | | | |
| T | 2 | • | | | | | | | |
| E | 3 | • | | | | | • | | |
| P | 4 | • | | | | | • | • | |
| S | 5 | • | | | | | • | • | • |

LOWERING SWITCHES

| | | 7 | 10 | 18 | 23 | 25 | 14 | 15 | 16 |
|---|---|---|---|---|---|---|---|---|---|
| | OFF | | | • | | | | | |
| S | 1 | | • | • | | | | • | • |
| T | 2 | | • | | • | | | • | • |
| E | 3 | | • | | • | | | • | |
| P | 4 | | • | | • | | | | |
| S | 5 | | • | | | • | | | |

Inventor

David C. Wright,

By Justin W. Macklin,

Attorney

Reissued Apr. 23, 1935

Re. 19,547

UNITED STATES PATENT OFFICE 19,547

MOTOR CONTROL SYSTEM

David C. Wright, Cleveland, Ohio, assignor to Electric Controller & Manufacturing Company, Cleveland, Ohio, a corporation of Ohio Original No. 1,840,281, dated January 5, 1932, Serial No. 395,809, September 28, 1929. Application for reissue December 30, 1933, Serial No. 704,699

31 Claims. (Cl. 172—179)

Figures 1, 2, 3:
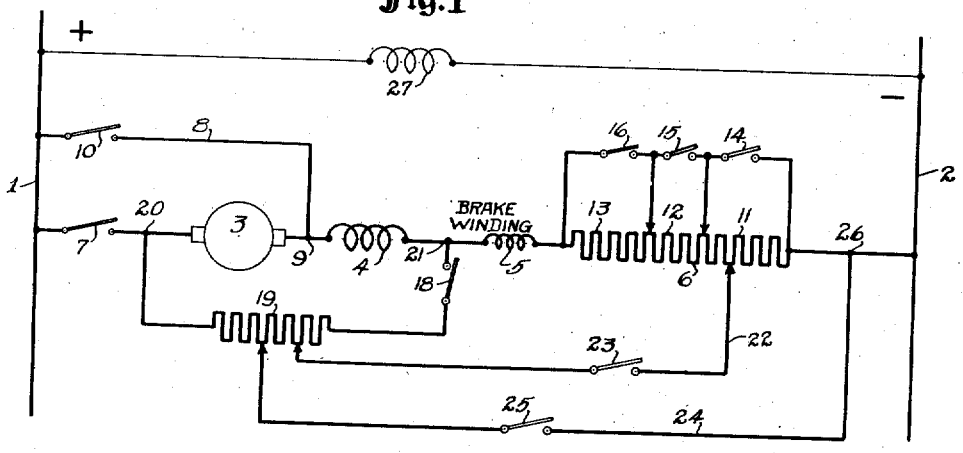

My invention relates to motor control systems. It relates more particularly to control systems for hoisting motors wherein the armature and field windings are connected in series for hoisting and in parallel paths for lowering.

It has been the practice in some systems when lowering a load to connect, on the first point of the controller, the series field winding and the winding for a series brake in series in one path and to by-pass these windings by the armature and a shunting resistance in another path, these paths being connected in series with a current-limiting resistance. In systems of this type a part only of the current taken from the supply line passes through the brake winding, and it is generally necessary to make the shunting resistance have a comparatively low value so as to secure a high dynamic braking torque and slow speed on heavy overhauling loads on the first controller point on lowering, but this lowering of the shunt resistance allowed less current to pass through the brake winding because more current passed from the line through the armature shunt.

It is one object of this invention to parallel the field winding by the armature and the shunting resistance and to connect a series brake winding and current-limiting resistance in series with the parallel paths just described so that all the current taken from the supply line passes through the brake winding and so that the shunting resistance can be made as low as required without reducing the amount of current flowing through the brake winding. With my system the lower the shunt resistance the higher the current flowing through the brake winding.

Another object of the invention is to shunt the motor with the shunting resistance on one of the hoisting positions of the controller to reduce the voltage at the motor terminals to obtain a very slow hoisting speed.

Another object of the invention is to use a shunting resistance connected across the armature and field windings to retard the motor when the source of supply is disconnected from the motor and to use a portion only of this resistance in a dynamic braking circuit when power is applied for operating the motor in the lowering direction at slow speeds.

I am aware that in previous systems all of the shunting resistance used for stopping has been connected in the dynamic braking power lowering circuits for slow and intermediate speeds and a portion of the shunting resistance has been cut out to obtain a high speed in lowering, but I prefer to use a portion only of the shunting resistance in power lowering to obtain slow speeds. This arrangement has the important advantage of saving the amount of resistance material in the shunting resistance since only a part of it is used in practically all of the power lowering positions of the controller.

This arrangement also provides a convenient means for accurately adjusting the resistance values in the dynamic braking circuits to effect the desired ranges of motor speeds in the power lowering positions of the controller.

Another object of this invention is to provide for a motor having its field and armature in shunt during lowering, improved circuits which will give positive driving torque on non-overhauling loads and dynamic braking torque on overhauling loads. Other objects will appear hereinafter.

Referring to the accompanying drawing, Fig. 1 shows a diagram of my motor control system. Fig. 2 is a diagram indicating the position of the switches for the various controller points or steps during a hoisting operation. Fig. 3 is a similar diagram indicating the position of the switches during a lowering operation.

On the drawing 1 and 2 represent positive and negative current supply lines. The armature 3, the field winding 4, and electro-magnetic brake winding 5 and the current-limiting resistance 6 are connected in the order named between lines 1 and 2. 7 is a switch between the line 1 and the armature. 8 is a wire connected between the line 1 and the point 9 between the armature and the field winding. The wire 8 has the switch 10.

The resistance 6 is divided into the sections 11, 12 and 13, controlled by the respective switches 14, 15 and 16.

A wire having the switch 18 and the shunting resistance 19 has one end connected to the point 20 between the armature 3 and the switch 7, and the other end to the point 21 between the field winding 4 and the brake winding 5.

A wire 22 having the switch 23 is connected adjustably at one end to the resistance 6 and at the other end to an intermediate point on the resistance 19.

A wire 24 having the switch 25 is connected at one end to the point 26 between the wire 2 and the resistance 6 and at the other end adjustably to the resistance 19.

The switch 18 is in closed position while the controller is in the off position, as shown by Figs. 2 and 3.

The operation of the system during the hoisting of a load will now be described, reference being made to Figs. 1 and 2. On the first step as shown in Fig. 2 the switch 7 is closed (the switch 18 remaining closed) which connects the armature, the field and the brake windings and the resistance 6 in a series circuit across the lines 1 and 2, the armature and the field windings being in a circuit parallel with the resistance 19. These circuits provide a very low speed of the motor, since the current in the motor is reduced by virtue of the parallel circuit through the resistance 19.

On the second step the switch 18 is opened which removes the shunt or parallel circuit around the armature and the field winding. This causes the speed of the motor to increase, since the voltage on the motor terminals is increased. The motor speed is further increased on steps 3, 4 and 5 by closing the switches 14, 15 and 16 successively as will be readily understood.

To slow down and stop the motor the switches are opened in reverse of the order just described, the switch 18 remaining closed on the off position.

The system during the lowering of a load will now be described, reference being made to Figs. 1 and 3.

On step 1 switches 10, 15 and 16 are closed, the switch 18 remaining closed, as shown in Fig. 3. Current from the supply line 1 flows through the switch 10 to the point 9 where it divides into two branches, one branch including the field winding 4 and the other branch the armature 3, the shunting resistance 19 and the switch 18. The two branches unite at the point 21 from which the entire current through the motor flows in series through the brake winding 5, the switches 16 and 15 and the resistance section 11 to the supply line 2. The current flows in the same direction in the field winding as during the hoisting operation, but in the reverse direction through the armature, so that the armature rotates in the opposite direction from that which it rotated during the hoisting operation. All the current flowing from the line 1 passes through the brake winding which insures the release of the brake at once. The circuits described provide on the first step lowering a low resistance dynamic braking circuit with high dynamic braking torque for overhauling loads and provides positive driving torque of low value for non-overhauling loads.

On step 2 the switch 23 is closed and the switch 18 is opened whereby a selected amount of resistance is inserted in the dynamic braking circuit whose right hand point 21 has been moved to a point on the resistance section 11. The opening of switch 18 removes the armature as a shunt around the field, the latter having a low resistance, thereby increasing the resistance in the dynamic braking circuit and causing the dynamic braking torque to be reduced and the speed of overhauling loads to be increased. Also the voltage applied on the armature is increased which causes the torque on non-overhauling loads to be increased.

If the dynamic braking circuit is opened with an overhauling load on the motor the load will accelerate the motor to a dangerous speed. Therefore, to prevent opening the dynamic braking circuit during the switch from step 1 to step 2, it is preferable to close switch 23 before switch 18 is opened. The simultaneous closure of switches 18 and 23 connects a shunt circuit around the brake winding momentarily which shunt circuit includes a part of the shunting resistance 6, but the resistance of this shunt circuit is not of a low enough value to cause the brake winding to be deenergized.

On step 3 the switch 16 is opened whereby the resistance section 13 is inserted in the dynamic braking circuit. This weakens the field current so that the speeds of both types of loads are increased.

On step 4 the switch 15 is opened which causes the resistance section 12 to be inserted in the dynamic braking circuit which causes the speeds of both types of loads to increase.

On step 5 switch 25 is closed and the switch 23 is opened. Now the entire resistance 6 is in the dynamic braking circuit, whereby the field is still further weakened and the voltage applied to the armature is increased, so that the speeds of both types of loads are still further increased.

In moving the controller from the fifth step lowering toward the off position, the operation of the switches as shown by Fig. 3 provide the dynamic braking circuits described for reducing the speed of the motor at each successive step until the off position is reached when the armature, the field and the shunting resistance 19 are connected in a dynamic braking circuit with the brake winding de-energized. In order to prevent opening the dynamic braking circuit while switching from step 4 to step 5 in lowering, it is preferable to close switch 25 before switch 23 is opened. Likewise, in switching from step 5 to step 4 in lowering, it is preferable to close switch 23 before switch 25 is opened.

In manual controllers when the switches are operated by hand, this can be accomplished by overlapping the contacts.

When magnetically-operated contactors are used for the switches shown in the drawing, the simultaneous energization of the operating coils of the contactors 18 and 23 will accomplish the above purpose because it is well known that the usual design of magnetically-operated contactors is such that the closing time of a normally-open switch, such as the contactor 23 is shorter than the opening time of a normally-closed contactor, such as contactor 18.

It is common practice to interlock the control circuits for the operating coils of these two contactors so that the contactor 18 cannot open until the contactor 23 has closed. Similar methods can be used to control the closing and opening of contactors 25 and 23 respectively or the closing and opening of contactors 23 and 25 respectively, which methods are well-known to those acquainted with this art.

I have not shown in the drawing a manual controller for operating the switches in the order and grouping described herein nor have I shown the control circuits for operating the magnetically-operated contactors of a magnetic switch controller for so doing, but engineers skilled in the art to which this invention belongs, can easily provide a suitable manual controller, or the control circuits for operating a magnetically-operated controller, whereby the system as described will be successfully operated.

The foregoing description relates to series-wound motors, but this invention is applicable to compound-wound motors, Fig. 1 showing the shunt field winding 27 in addition to the series field winding 4.

I claim:

1. For a motor control system for hoists, means for connecting the motor armature and the series field winding in series for hoisting, means for connecting the motor armature and the series field winding in parallel for lowering, a brake winding for the motor, connecting means for causing the value of the current in the brake winding to be equal to the sum of the values of current in the motor armature and field windings when current is first admitted to the motor in lowering, and means for subsequently transferring the brake winding to the parallel path containing the field winding without short circuiting the brake winding.

2. For a motor control system, a motor, a series field winding therefor, a resistance, a brake winding for the motor, means for connecting the resistance and the brake winding in series with two parallel paths, one path containing the motor armature and the other path containing the series field winding, connections whereby the said means cause the value of the current in the brake winding to be equal to the sum of the values of current in the motor armature and field windings, and means for subsequently transferring the brake winding to the parallel path containing the field winding without short circuiting the brake winding.

3. For a motor control system, a motor having a series field winding, a series brake winding therefor, a resistance for the motor circuit, means for connecting the motor armature, the series field, the brake winding and the resistance in series for operation in one direction, reversing means for connecting the resistance and the brake winding in series with two parallel paths, one path containing the armature and the other path containing the series field winding for operation in the other direction, connections whereby the said reversing means cause the value of the current in the brake winding to be equal to the sum of the value of current in the motor armature and field windings, and means for subsequently transferring the brake winding to the parallel path containing the field winding without short circuiting the brake winding.

4. For a motor control system, a source of supply, a motor having armature and field windings, a brake winding for the motor, a current-limiting resistance, a shunting resistance normally shunted across the motor armature and the field windings, means connecting the current-limiting resistance and the brake winding in series with two parallel paths, one path containing the armature and the field winding of the motor and the other path containing the shunting resistance, and means for opening the circuit of the parallel path containing the shunting resistance while maintaining the current limiting resistance, the brake winding and the parallel path containing the armature and field winding connected to the source.

5. For a motor control system, a source of supply, a motor having armature and field windings, a brake winding for the motor, a current-limiting resistance, a shunting resistance normally shunted across the motor armature and the field winding, means connecting the current-limiting resistance and the brake winding in series with two parallel paths, one path containing the armature and the field winding of the motor and the other path containing the shunting resistance, means for opening the circuit of the parallel path containing the shunting resistance while maintaining the current limiting resistance, the brake winding and the parallel path containing the armature and field winding connected to the source, and means for varying the current-limiting resistance.

6. For a motor control system for hoists, a motor having armature and field windings, a brake winding, a current-limiting resistance, a shunting resistance, means on first application of power in lowering for connecting the current-limiting resistance and the brake winding in series with a branched circuit, one branch containing the motor field and the other branch containing the motor armature and the shunting resistance, a dynamic braking circuit connecting a point on the shunting resistance to a point on the current limiting resistance, means for closing and opening the latter circuit, and means for opening the said branched circuit containing the armature and the shunting resistance.

7. For a motor control system for hoists, a motor having armature and field windings, a brake winding, a current-limiting resistance, a shunting resistance, means on first application of power in lowering for connecting the current-limiting resistance and the brake winding in series with a branched circuit, one branch containing the motor field winding, the other branch containing the motor armature and the shunting resistance, a dynamic braking circuit connecting a point on the shunting resistance to a point on the current-limiting resistance, means for closing and opening the latter circuit, means for opening the said branch circuit containing the armature and shunting resistance, and means for increasing the resistance in the dynamic braking circuit and the voltage applied to the terminals of the motor armature.

8. For a motor control system for hoists, a source of supply, a motor having armature and field windings, a current-limiting resistance, a shunting resistance, means for securing slow speed lowering including a connection from the source of current to the limiting resistance in series with a branched circuit, one branch containing the motor field and the other branch containing the motor armature and the shunting resistance, means for increasing the lowering speed, including a dynamic braking circuit connecting a point on the shunting resistance to a point on the current-limiting resistance, means for opening the said branch of the circuit containing the motor armature and the shunting resistance, and means for further increasing the lowering speed including a connection from a point on the shunting resistance to the source of supply, and means for opening the said connection between the shunting resistance and the current-limiting resistance.

9. For a motor control system for hoists, a source of supply, a motor having armature and field windings, a current-limiting resistance, a shunting resistance means for securing slow speed lowering including a connection from the source to the limiting resistance in series with a branched circuit, one branch containing the motor field and the other branch containing the motor armature and the shunting resistance, means for increasing the lowering speed including a dynamic braking circuit connecting a point on the shunting resistance to a point on the current-limiting resistance, means for opening the said branched circuit containing the motor armature and the shunting resistance, and means for increasing the resistance in the dynamic braking circuit and the voltage on the motor armature for further increasing the lowering speed.

10. For a motor control system for hoists, a source of supply, a motor having armature and field windings, a brake winding, a current-limiting resistance, a shunting resistance, a slow speed contact normally closed connecting the armature and field windings in a branched circuit for effecting slow speed of said motor, one branch containing the field winding and the other branch containing the armature and the shunting resistance, intermediate and high speed contacts for respectively effecting intermediate and high speeds of said motor, current-conducting means including a set of main contacts for connecting the said source to the current-limiting resistance and the brake winding in series with the said branched circuit, means for closing and opening the intermediate speed contact between a point on the shunting resistance and a point on the current limiting resistance, means for opening the said normally closed slow speed contact, and means for closing the high speed contact between a point on the shunting resistance and the source.

11. For a motor control system for hoists, a source of supply, a motor having armature and field windings, a brake winding, a current-limiting resistance, a shunting resistance, a normally closed slow speed contact for forming a branched circuit for effecting slow speed of said motor, one branch containing the field winding and the other branch containing the armature and the shunting resistance, intermediate and high speed contacts for respectively effecting intermediate and high speeds of said motor, current-conducting means including a set of main contacts for connecting the said source, the current-limiting resistance and the brake winding in series with the branched circuit, means for connecting the intermediate speed contact to a point on the shunting resistance and to a point on the current-limiting resistance, means for opening the said normally closed slow speed contact, means for connecting the high speed contact to a point on the shunting resistance and to the source, and for opening the intermediate speed contact, and means for varying the current-limiting resistance.

12. In a motor control system for hoists, a source of supply, a motor having armature and field windings, a brake winding, a shunting resistance, a current-limiting resistance, a normally closed loop circuit including the motor armature, the field winding and the shunting resistance, means in hoisting for connecting the current-limiting resistance and the brake winding to the source of supply in series with the said loop circuit and for connecting the armature and the field windings in parallel with the shunting resistance, and means for opening the loop circuit, in combination with means in lowering for connecting the current-limiting resistance and brake winding to the source in series with the said loop circuit and for connecting the field winding in parallel with the armature and shunting resistance.

13. In a motor control system for hoists, a source of supply, a motor having armature and field windings, a brake winding, a shunting resistance, a current-limiting resistance, a normally closed loop circuit including the motor armature, the field winding and the shunting resistance, means in hoisting for connecting the current-limiting resistance and the brake winding to the source of supply in series with the loop circuit and for connecting the armature and the field windings in parallel with the shunting resistance, and means for opening the loop circuit, in combination with means in lowering for connecting the current limiting resistance and the brake winding to the source in series with the loop circuit and for connecting the field winding in parallel with the armature and the shunting resistance, speed increasing contacts, and means for closing the said speed increasing contacts to a point on the shunting resistance and to a point on the current-limiting resistance, and means for opening the said loop circuit to obtain a higher lowering speed of the motor.

14. In a motor control system for hoists, a source of supply, a motor having armature and field windings, a brake winding, a shunting resistance, a current-limiting resistance, a normally closed loop circuit including the motor armature, the field winding and the shunting resistance, means in hoisting for connecting the current-limiting resistance and brake winding to the source in series with the said loop circuit, and for connecting the armature and field windings in parallel with the shunting resistance, and means for opening the loop circuit, in combination with means in lowering for connecting the current-limiting resistance and the brake winding to the source in series with the said loop circuit and for connecting the field winding in parallel with the armature and shunting resistance, intermediate and high speed contacts for respectively effecting intermediate and high speeds of said motor, means for closing the intermediate speed contacts to a point on the shunting resistance and to a point on the current-limiting resistance, means for opening the said loop circuit for obtaining a higher lowering speed of the motor, and means for connecting the high speed contacts to a point on the shunting resistance and to the said source.

15. The method of changing the speed of a hoist motor associated with an electric brake while lowering, wherein a current limiting resistance, the motor brake winding and a branched circuit having two parallel paths are connected in series to the supply lines, one path containing the motor field and the other containing the motor armature and a shunting resistance, which consists in including the brake winding in the parallel path containing the motor field and excluding a portion of the said shunting resistance from the parallel path containing the motor armature.

16. For a motor control system for hoists, a source of power, a motor having armature and field windings, a plurality of independently operated contactors, a resistor, means whereby certain of said contactors connect the armature and field windings and the resistor in a closed circuit when the source is disconnected from the motor, current varying resistance, means whereby certain of said contactors connect the armature and field winding and some of the current varying resistance in series to the source for hoisting the load, means for lowering the load at slow speed comprising certain of said contactors for connecting the source to a portion of the current varying resistance in series with a branched circuit, one branch containing the motor armature, the other branch containing the motor field, said means including certain of said contactors for connecting an intermediate point of the said resistor to an intermediate point of the current varying resistance so as to include only a part of the resistor and a part of the current varying resistance in the branch containing the armature.

17. For a motor control system for hoists, a source of power, a motor having armature and field windings, a resistor, a plurality of independently operated contacts, certain of said contacts normally closed when the source is disconnected from the motor for connecting the armature and field windings and the resistor in a closed dynamic braking circuit, a current varying resistance, means whereby certain of said contacts connect the source to a hoisting circuit for the motor including the armature and field windings and some of the current varying resistance in series, means whereby certain of said contacts connect the source to a lowering circuit for the motor including some of the current varying resistance in series with a branched circuit, one branch containing the field winding and the other branch containing the armature, said lowering circuit including certain of said contacts connecting an intermediate point on said resistor to the current varying resistance whereby a portion only of said resistor is included in the branch containing the armature to form a dynamic braking circuit, and means for operating certain of said contacts for connecting an intermediate point on said resistor to the source to increase the voltage on the motor armature whereby the lowering speed of the motor is increased.

18. For a motor control system for hoists, a source of power, a motor with armature and field windings, current varying resistance, a shunting resistor, a motor brake winding, means for connecting the shunting resistor as a shunt across the armature and field windings when the motor is disconnected from the source, means in hoisting for connecting the armature, field and brake windings in series, means in lowering for connecting some of the current varying resistance and brake winding in series with a branched circuit, one branch containing the motor field and the other branch containing the motor armature and the shunting resistance and means for transferring the brake winding to the branch circuit containing the motor field winding without short circuiting the brake winding.

19. In a motor control system for hoists, a source of power, a motor having armature and field windings, a resistance, a winding for releasing a motor brake, means connecting one terminal of the resistance to the armature and the other terminal of the resistance to the field winding and to one terminal of the brake winding, whereby the armature and field winding and the resistance are connected in a dynamic braking circuit, and means for obtaining slow speed lowering including the closing of a shunt circuit extending from an intermediate point on the resistance and including the brake and field windings whereby the armature, the field winding, a part of said resistance and the brake winding are included in another dynamic braking circuit.

20. In a control system for electric hoists, a source of supply, a motor having armature and field windings, a shunting resistance, a current limiting resistance, a normally-closed contactor for connecting the armature and field windings and the shunting resistance in a safety dynamic braking circuit when the source is disconnected from the motor, a hoisting contactor for connecting the source directly to one terminal of the armature in series with the field and the current limiting resistance, a lowering contactor for connecting the said source directly to the other terminal of the armature and at the same time directly to one terminal of the field and means associated therewith for connecting the armature and field windings in parallel branch circuits to form a plurality of dynamic braking circuits containing different resistance values of said resistances to vary the lowering speed of the motor, and means for regulating the resistance in the armature branch circuit to a value less than the resistance in the said safety dynamic braking circuit to obtain a slow speed of the motor.

21. A system adapted to control a series motor and a brake-winding for hoists, or the like, comprising: means for connecting the motor armature and the series field windings of said motor in series for hoisting; a shunting resistor; means for connecting said series field winding in parallel with a circuit including said motor armature and said shunting resistor for initial lowering; and connecting means for causing the value of the current in said brake winding to be equal to the sum of the values of current in said armature and said field windings when current is supplied to operate said motor in lowering.

22. A system adapted to control a motor having series field and armature windings and a brake-winding for hoists, or the like, comprising: a current-limiting resistance; resistance means; means for connecting said current-limiting resistance and said brake winding in series with two parallel paths, one of said paths including at least a portion of said resistance means and one of the windings of said motor, and the other of said paths including another winding of said motor; and connections whereby said means cause the value of the current in said brake winding to be equal to the sum of the values of the current in said two parallel paths while said hoist is moving a load.

23. A system adapted to control a series motor and a brake-winding for hoists, or the like, comprising: a current-limiting resistance; means for connecting the armature winding and the series field winding of said motor, said brake-winding and said current-limiting resistance in series for applying power to drive said motor in one direction; resistance means; reversing means for applying power to drive the motor in the opposite direction by connecting said current-limiting resistance and said brake winding in series with two parallel paths, one of said paths including one of said motor windings and at least a portion of said resistance means, and the other of said paths including the other of said motor windings; and connections whereby said reversing means cause the value of the current in said brake winding to be equal to the sum of the values of current in said two parallel paths.

24. A system adapted to control a series motor and a brake-winding for moving a load, comprising: a controller including means for connecting the armature winding and series field winding of said motor in series for moving said load in one direction; a shunting resistor; a normally closed separately actuated contactor for connecting said shunting resistor as a shunt across said motor armature and said series field windings when said controller is in its off position; means for connecting one of said motor windings in parallel with a circuit containing the other of said motor windings and said shunting resistor for moving said load in a direction opposite to said one direction; and connecting means for causing the value of the current in said brake winding to be equal to the sum of the values of current in said motor armature and said field windings when current is supplied to operate said motor in said opposite direction.

25. A system adapted to control an electrical motor and a brake-winding for hoists, or the like, comprising: a shunting resistance normally shunted across the armature winding and field winding of said motor; a current-limiting resistance; means connecting said current-limiting resistance and said brake-winding in series with two parallel paths for effecting comparatively slow hoisting of a load, one of said parallel paths including said armature winding and said field winding, and the other of said parallel paths including said shunting resistance; and means for opening said other path including said shunting resistance, for effecting comparatively rapid hoisting of said load.

26. A system adapted to control an electric motor and a brake-winding for hoists, or the like, comprising: a shunting resistance normally shunted across the armature winding and field winding of said motor; a current-limiting resistance; means connecting said current-limiting resistance and said brake-winding in series with two parallel paths for effecting comparatively slow speed hoisting of a load, one of said parallel paths including said armature winding and said field winding, and the other of said parallel paths including said shunting resistance; means for opening said other parallel path including said shunting resistance; and means for varying said current-limiting resistance; said opening means and said resistance-varying-means operating to effect comparatively rapid hoisting of said load.

27. A system adapted to control an electric motor and a brake-winding for hoists, or the like, comprising: a current-limiting resistance connected in series with the armature and field winding of said motor; a shunting resistance; means for connecting said shunting resistance, said armature and field windings in a closed circuit, for effecting comparatively slow speed lowering and slow speed hoisting of a load on said hoist; and means for connecting a portion of said shunting resistance, a portion of said current-limiting resistance, said brake winding, said armature winding and said field winding in another closed circuit, for effecting comparatively high speed lowering of said load.

28. A system adapted to control an electric motor and a brake-winding for hoists, or the like, comprising: a loop-circuit including the armature winding and the field winding of said motor; means for passing current in one direction through said loop-circuit; means for passing current in a direction reversed to said one direction through at least a part of said loop-circuit; and means for connecting said brake-winding in series with said loop-circuit while current flows in said loop-circuit in said one direction and in said reverse direction.

29. A system adapted to control an electric motor and a brake-winding for hoists, or the like, comprising: a loop-circuit including the armature winding and the field winding of said motor; means for passing current in one direction through said loop-circuit; means for passing current in a direction reversed to said one direction through at least a part of said loop-circuit; means for connecting said brake-winding in series with said loop-circuit while current flows in said loop-circuit in said one direction and in said reverse direction; and means for maintaining said loop-circuit while the direction of current flow in said loop-circuit is changed from said one direction to said reverse direction.

30. A system adapted to control an electric motor having an armature winding and a series field winding for hoists, or the like, comprising: a controller having a plurality of separately actuated contactors; resistance means; current-limiting resistance; certain of said contactors connecting said armature and field windings in series with said current-limiting resistance in hoisting; certain of said contactors being normally closed to connect at least a portion of said resistance means as a shunt across said motor windings when said controller is in its off position; certain of said contactors in a relatively slow-speed lowering position of said controller connecting a portion of said current-limiting resistance in series with two parallel paths, one of said paths including another portion of said current-limiting resistance and one of said motor windings, the other of said paths including a portion of said resistance means and the other of said motor windings, some of said certain contactors in lowering joining one terminal of said field winding and one terminal of said armature winding directly to a source of power.

31. A system adapted to control an electric motor having an armature winding and a series field winding for hoists, or the like, comprising: a controller having a plurality of separately actuated contactors; resistance means; current-limiting resistance; certain of said contactors connecting said armature and field windings in series with said current-limiting resistance in hoisting; certain of said contactors being normally closed to connect at least a portion of said resistance means as a shunt across said motor windings when said controller is in its off position; certain of said contactors in a relatively slow-speed lowering position of said controller connecting a portion of said current-limiting resistance in series with two parallel paths, one of said paths including another portion of said current-limiting resistance and one of said motor windings, the other of said paths including a portion of said resistance means and the other of said motor windings; and certain of said contactors in a relatively high-speed lowering position of the controller connecting said motor windings in parallel paths, one of said paths including a greater ohmic value of said current limiting resistance, the other of said paths including a predetermined value of said resistance means.

DAVID C. WRIGHT.